(12) United States Patent
Ahlquist

(10) Patent No.: US 7,743,239 B2
(45) Date of Patent: Jun. 22, 2010

(54) ACCELERATING INTEGRITY CHECKS OF CODE AND DATA STORED IN NON-VOLATILE MEMORY

(75) Inventor: Brent M. Ahlquist, Loomis, CA (US)

(73) Assignee: Intel Corporation, Santa Clara, CA (US)

( * ) Notice: Subject to any disclaimer, the term of this patent is extended or adjusted under 35 U.S.C. 154(b) by 897 days.

(21) Appl. No.: 11/480,308

(22) Filed: Jun. 30, 2006

(65) Prior Publication Data

US 2008/0005587 A1    Jan. 3, 2008

(51) Int. Cl.
*G06F 12/14* (2006.01)
*G06F 9/44* (2006.01)

(52) U.S. Cl. .................. 713/1; 713/165; 713/189; 713/190; 717/114; 726/27; 726/32; 705/1; 711/103

(58) Field of Classification Search ............ 713/1, 713/165, 189, 190; 717/114; 726/27, 32; 710/260; 705/1; 711/103
See application file for complete search history.

(56) References Cited

U.S. PATENT DOCUMENTS

2002/0116633 A1* 8/2002 Kobayashi et al. .......... 713/200
2007/0192832 A1* 8/2007 Qi et al. ..................... 726/3

\* cited by examiner

*Primary Examiner*—Abdelmoniem Elamin
(74) *Attorney, Agent, or Firm*—Trop, Pruner & Hu, P.C.

(57) ABSTRACT

In some embodiments, a command may be used by a host processor to access certain information from a non-volatile memory, together with a message authentication code. That information may be utilized to generate a message authentication code on the processor. Then, in any future accesses, the message authentication code generated by the host processor may be compared to the message authentication code from the non-volatile memory to determine the integrity of data or code that is received from the non-volatile memory.

19 Claims, 4 Drawing Sheets

ACCELERATING INTEGRITY CHECKS OF CODE AND DATA STORED IN NON-VOLATILE MEMORY

BACKGROUND

This relates generally to enabling the authentication of information stored in non-volatile memory.

In many cases, during an initial booting of a processor-based system, the code that is available is limited. The code may be limited to information that is available on a boot read only memory (ROM). It may also be desirable to access information on a non-volatile memory, such as a flash memory, in association with the boot process. However, the host processor may know that it can trust what is in the boot ROM on board its own system, but may have no basis for having confidence in the integrity of information on an external memory.

As one possible application, a cellular telephone may have a host processor, a boot ROM, and a flash memory. The concern is that if the host, trusting data contained on the flash memory, uses that information to boot, the system could be corrupted. For example, the code in the flash might be altered by an unscrupulous user to obtain free phone service or to alter or copy the boot code.

Thus, authenticating the information on the external memory may be desirable. Generally, such authentication may take an amount of time. In the application of a phone, this may mean that, when the phone initially is turned on, it takes some amount of time for the phone to boot up and begin operating. In addition, every time it is necessary to access additional information from the non-volatile memory, an authentication protocol may be implemented which may be somewhat time consuming.

DETAILED DESCRIPTION

Figure 1:
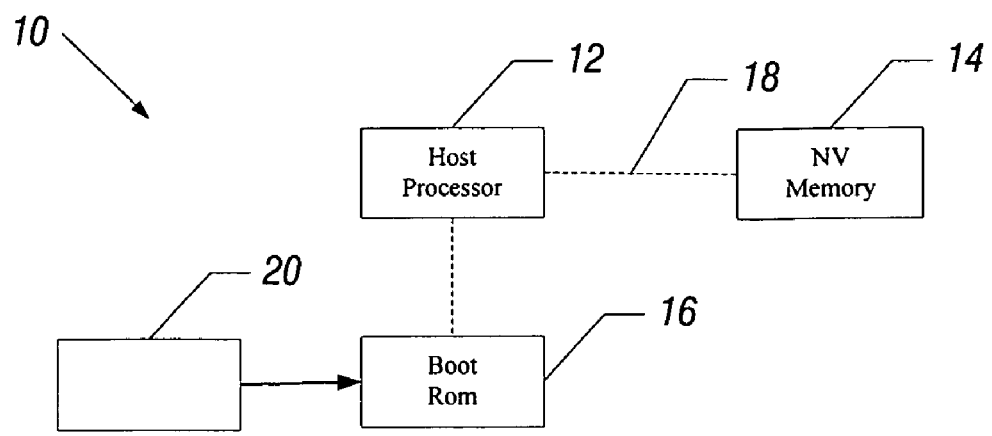
FIG. 1 is a schematic depiction of a processor-based system in accordance with one embodiment of the present invention.

Referring to FIG. 1, a processor-based system 10 may include a host processor 12 which may be associated with a boot read only memory (ROM) 16. In one embodiment, the boot ROM 16 may be part of the same integrated circuit that includes the host processor 12. Alternatively, it may be part of the same chipset. In either case, therefore, the ROM 16 is inherently reliable. As a result, communications between the ROM 16 and the processor 12 are treated as internal communications and no authentication would normally be required. When the processor and boot ROM are embedded within the same platform, corruption or intervention by an unscrupulous user is extremely difficult.

Also coupled to the host processor 12, over a bus 18, may be a non-volatile memory 14. In one embodiment, the non-volatile memory 14 may be a flash memory. The non-volatile memory 14 may be a reprogrammable memory which is subject to being corrupted by an unscrupulous user. As one example, such a user may attempt to change the code in the memory 14 in order to obtain services to which the user would not otherwise be entitled.

Thus, in accessing information of a critical nature, the host processor 12 can generally trust information it receives from the boot ROM 16 but may not always be able to inherently trust information it receives from the non-volatile memory 14.

This inability to trust external memory may be particularly critical in the boot process wherein information may be needed that exceeds the capacity of the boot ROM 16. Such information may then need to be obtained from the memory 14 which may have a greater capacity. In addition, because the memory 14 is reprogrammable, updates may be provided to boot code or other critical code which is only accessible from the memory 14.

Ideally, an authentication protocol is implemented between the memory 14 and the host processor 12. In some embodiments, it may be desirable that that authentication protocol be as efficient as possible to reduce time delays that may otherwise be inherent in the authentication process. In addition, the amount of data that is transferred over the bus 18 may be reduced or even minimized, in some embodiments, to improve operating efficiencies.

As one example, the system 10, shown in FIG. 1, may be a cellular telephone. Update information or other boot information may be provided on the memory 14. An unscrupulous user may attempt to reprogram the memory 14 to obtain free long distance service or to alter or steal code. Thus, it is desirable to authenticate any code or data that is obtained from the memory 14.

Figure 2:
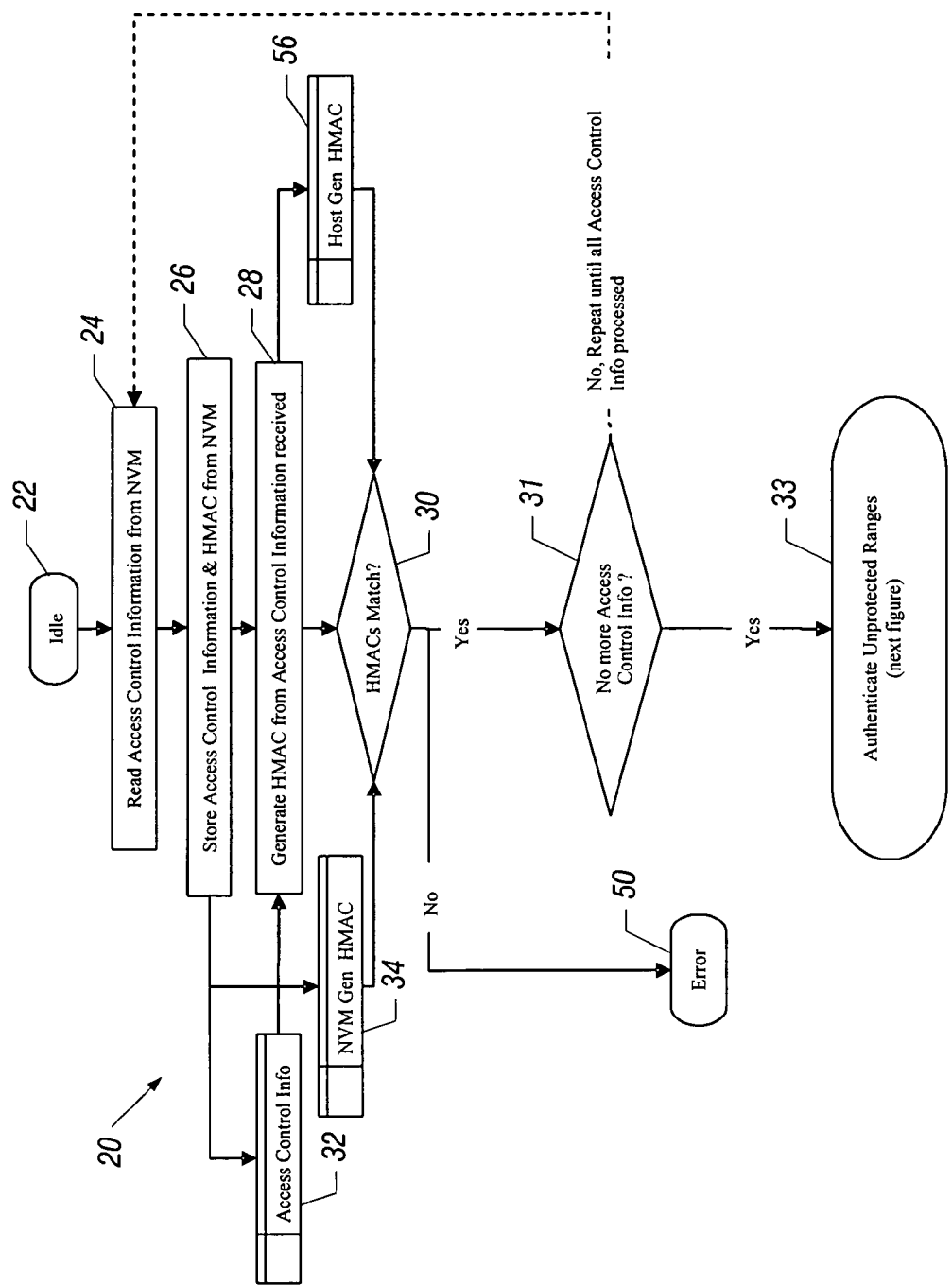
FIG. 2 is a flow chart for one embodiment of the present invention.

Referring to FIG. 2, an accelerated integrity check process may be implemented by the sequence 20. The flow applies when the access is directed to a protected access range that is known to be authentic, for example, because writes are prohibited or appropriately limited within that range. In some embodiments, the sequence 20 may be implemented in hardware, firmware, or software. In the case of a software implementation, the software may be stored in the boot ROM 16 as indicated in FIG. 1 at block 20.

Referring again to FIG. 2, initially, after an idle period 22, the host processor 12 may read access control information from the non-volatile memory 14 as indicated in block 24. Access control information may include information about various ranges of addresses within the memory 14. It may also include information about whether particular ranges are protected. One form of protection is to require that any writes be authenticated. This results in controlling the ability of intruders to change data stored in the memory 14. In addition, the access control information may include access attributes. These may be rules for a particular memory range, about how information may be accessed in that range. For example, a particular range may require authentication to write or change that region. In addition, various associations may be included in the access control information. The associations may associate a range with a particular authentication key. Finally, tags may be included in some embodiments of the access control information which provide an identifier for referencing slots. In one embodiment, a slot is an instance that describes a range.

In order to read the access control information from the non-volatile memory, the processor 12 may know the appropriate command to obtain the access control information from the non-volatile memory. In addition, that command may be used to obtain a message authentication code such as a keyed-hash message authentication code or HMAC.

A keyed-hash message authentication code is calculated using a cryptographic hash function in combination with a secret key. It may be used to verify data integrity and the authenticity of a message. Examples of cryptographic hash functions that may be used include MD-5 or SHA-1 that are used in the calculation of the HMAC. The command may enable the host processor 12 to get an HMAC of a digest of information for each slot, one slot at a time, where each slot may be separately authenticated through an HMAC.

Thus, the access control information is obtained from the non-volatile memory, as indicated in block 24, using the appropriate command which may be stored on the host processor 12, such as in the boot ROM 16. The access control information that has just been obtained, as well as the HMAC that was just obtained, may be stored in an appropriate memory associated with the host processor 12 as indicated in block 26.

Since the access control information is stored in a publicly inaccessible control region of the non-volatile memory 14, the information need not be authenticated in some embodiments. The access control information can be stored for use by the host in determining which regions are protected and which are unprotected. Generally, when protected regions are read, authentication need not be done.

Then, the host processor 12 may generate an HMAC from the access control information 32 that was received from the non-volatile memory 14 as indicated in block 28. Next, a check at diamond 30 determines whether the HMACs generated by the host processor 12 and as received from the non-volatile memory 14 match. Specifically, the access control information is utilized to generate the new HMAC in the host processor 12 as indicated at block 56. This new HMAC 56 that is host generated is then compared to the non-volatile memory generated HMAC 34 at diamond 30. If the two separately generated HMACs fail to match, there is an authentication problem and an error is reported, as indicated at block 50. Otherwise, a check at diamond 31 determines whether there is more access control information.

Figure 3:
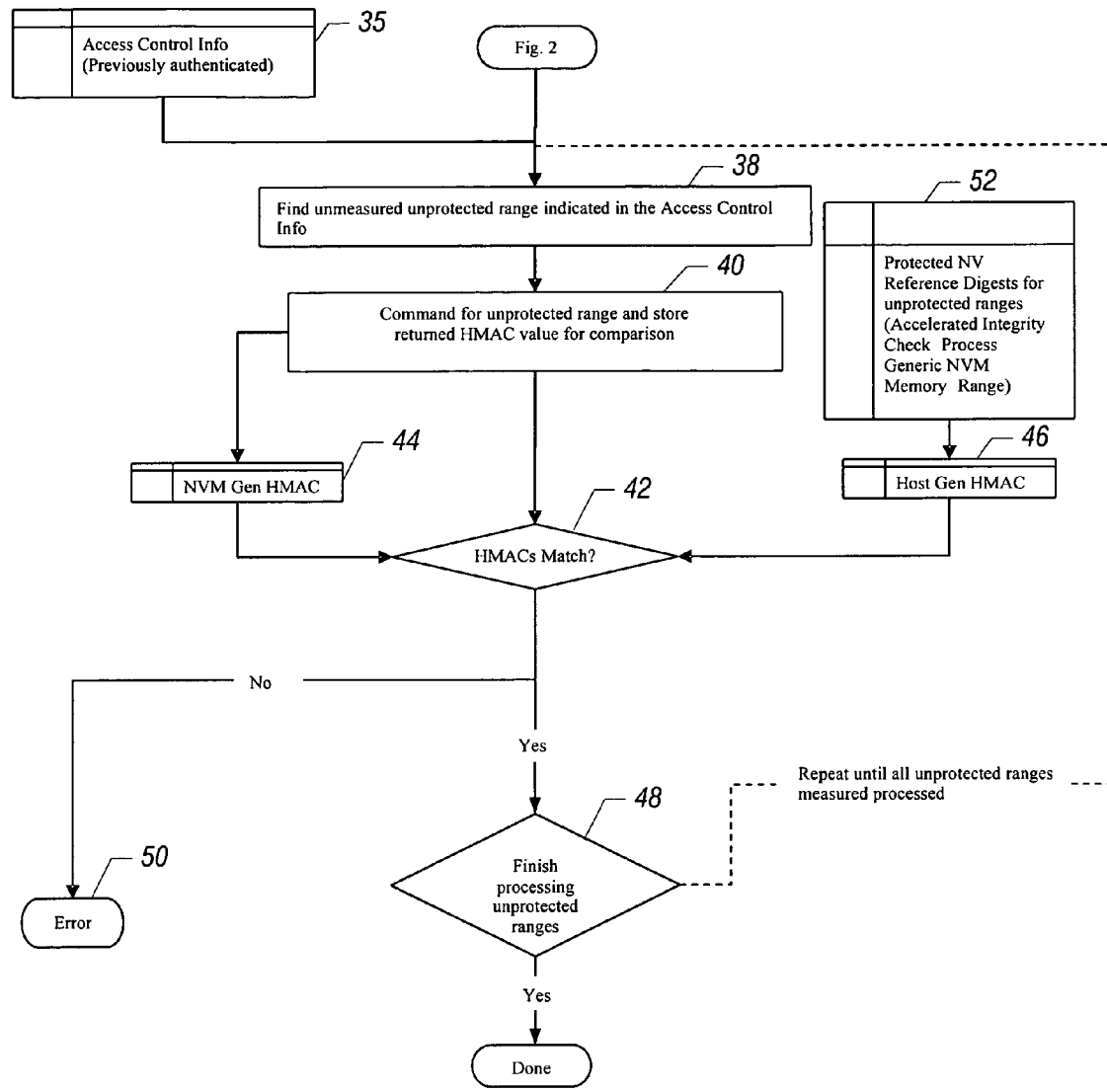
FIG. 3 is a flow chart for another embodiment of the present invention.

Once the access control information has been authenticated, if desired, it can be used to authenticate unprotected memory ranges (operation 33 in FIG. 2). Referring to FIG. 3, an unprotected memory range may not be protected (e.g. by precluding writes) and may not have previously been measured or subjected to an HMAC. By "measure," it is intended to refer to the host process of reading the data again from the non-volatile memory to be sure the host received data from the memory, not from an interloper.

Starting at block 38, the subject range is located within the previously received access control information 35. A host measure range command is then executed for the correct unprotected range as indicated in block 40. Also, a returned HMAC may be stored for subsequent comparison. The memory range sample authentication is determined by comparing locally generated and received HMACs, as indicated in diamond 42, where the locally generated or host generated HMAC is the HMAC 46 and the non-volatile generated HMAC is the HMAC 44. The non-volatile generated HMAC 44 may be derived from the original access control information 35.

The protected reference digests may be estimated for the selected unprotected range (block 52). The digests are read from the non-volatile memory and may be measured to guarantee authenticity even when they come from protected regions in one embodiment. For other embodiments no authentication may be used. The digests may be used to generate the host generated HMAC 46.

Therefore, for each range, it is not necessary to again send the access control information across the memory bus 18. The sequence is repeated until the authenticity of all of the access control information and samples for each region in question is completed. The accelerated integrity check concludes trustworthiness based on information provided in the original transfer of access control information.

In some embodiments, an access control table may describe ranges of the non-volatile memory 14 and their associated keys, as well as whether or not a range of flash may be authenticated. In some ranges, no measure or authentication process may be necessary. All that the host processor needs to know is the command that will return the data from the memory 14, together with an HMAC, for the return data. The processor can check to see if the data really came from the memory 14. In such case, both the processor 12 and the memory 14 have a shared private key. The processor then knows whether it is an authenticated flash that it is dealing with and can trust what information it receives thereafter.

Normally, after a time interval from an initial measurement or authentication protocol, the host cannot be sure that the code can still be trusted. A re-check of the code integrity would be necessary, which takes additional time.

In some embodiments of the present invention, once the memory 14 has provided the HMAC and has indicated what ranges are protected, further authentication, measurements, or hash calculations can be reduced or avoided in some cases. Because the host has a digest from the original transaction of the access control information, it can use that information to determine the accuracy and reliability for subsequent accesses. For example, if a smaller range of data has already been verified, a larger range measurement can be compared to values in a table for the smaller range so that the larger range can also be quickly authenticated. This avoids the need for the host processor 12 to have to read all the data across the memory bus 18 and measure the data itself, every single time it does a measurement. Since the host processor 12 did the measurement when it downloaded (updated) the data originally, it can rely on this data and this measurement because the original data did not have to go across the memory bus. Then, the host processor 12 has the data for all future checks, reducing bus traffic.

The image of a digest table (which is smaller than all the digested or summarized data) may be written during factory programming so it is secure. As another alternative, the image may be updated in an authenticated manner by the processor during modification of the larger range. If the digest for the larger range is updated when modifications are made, the authenticated digest table measured with a measure range command, read across the memory bus and authenticated, the digest can be used to authenticate the content of the larger range representing the associated digest entry.

Figure 4:
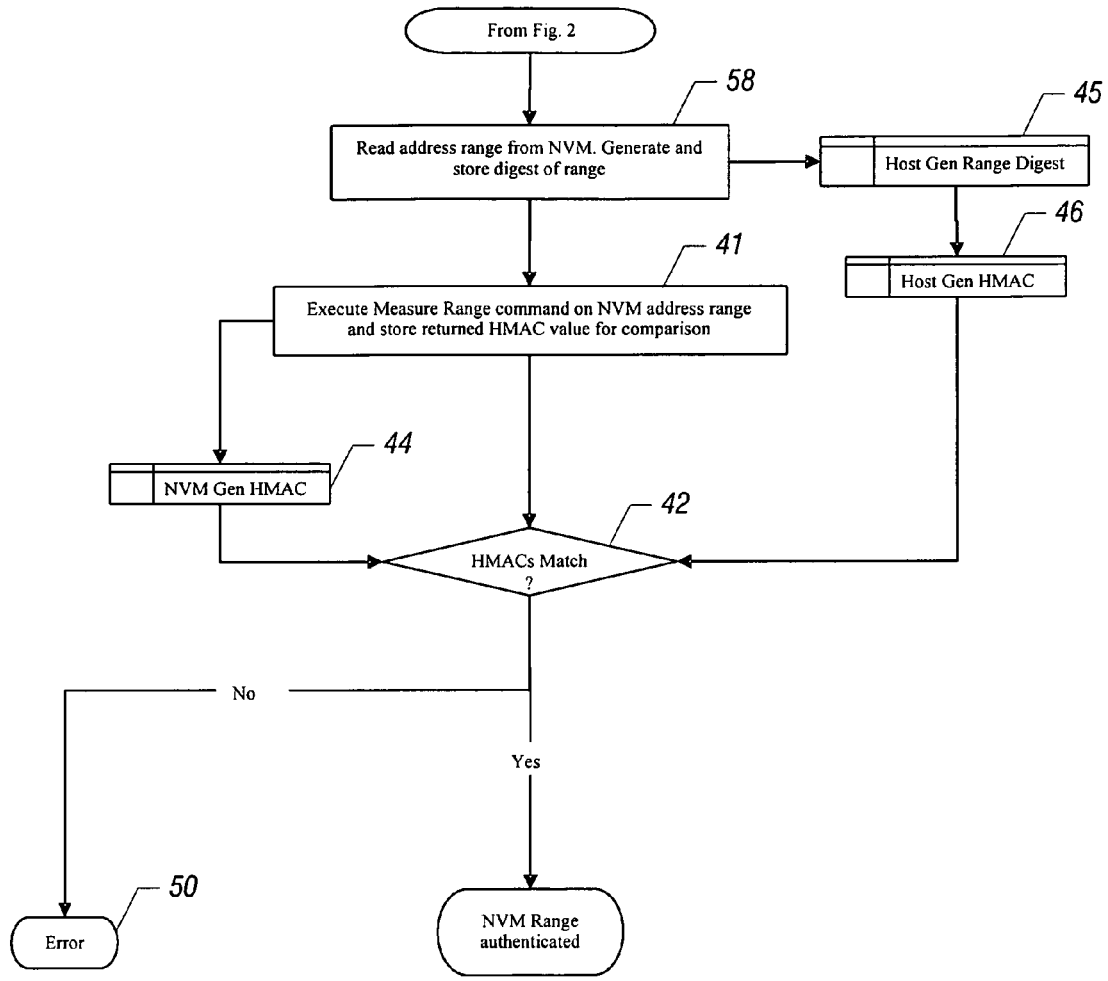
FIG. 4 is a flow chart for another embodiment of the present invention.

Referring to FIG. 4, an alternative flow is illustrated which, like the other flows, may be implemented in hardware, software, or firmware. The sequence may be used for both protected and unprotected ranges. In this sequence, after doing the sequence shown in FIG. 2, starting at block 58, an address range is read from the non-volatile memory and a digest of the range is stored and generated. The digest provides certain information that can be used for authentication. Necessarily, it is composed of less data than the entire address range. Thus, the digest may be more readily and efficiently transferred across the memory bus as needed. Then a host generated range is developed as indicated in block 45. Also, a host generated HMAC is developed at block 46.

In the meantime, the host executes a measure range command on the non-volatile memory address range and stores a return HMAC value for comparison (block 41). The non-volatile memory generated HMAC 44 is compared to the host generated HMAC 46 in diamond 42. If they match, the range has been authenticated. Otherwise, an error is indicated at 50.

Figure 5:
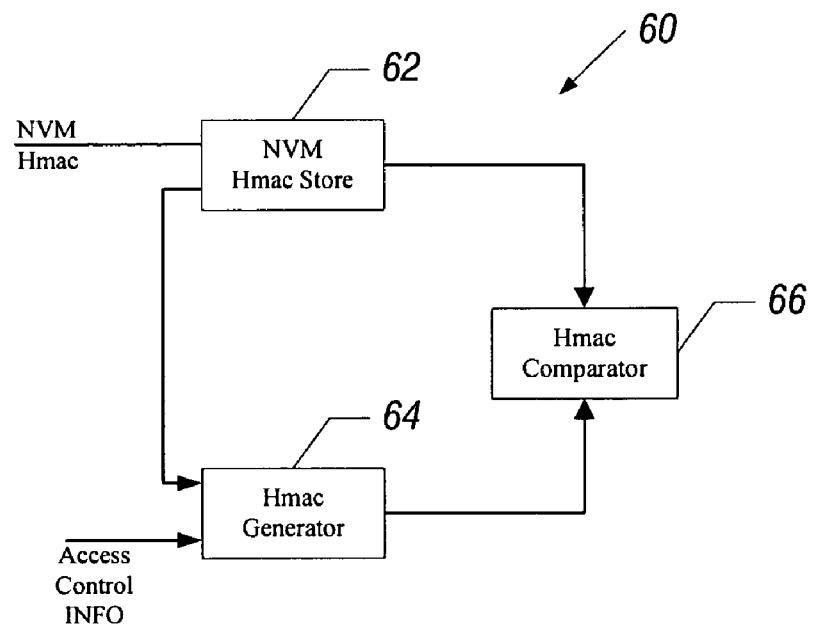
FIG. 5 is a depiction of another embodiment of the present invention.

Referring to FIG. 5, in accordance with another embodiment of the present invention, the sequence shown in FIG. 2 may be implemented in a hardware implementation. In this case, the non-volatile memory HMAC is received by a non-volatile memory HMAC store 62. It is then provided to an HMAC generator 64. The HMAC generator receives the access control information from the non-volatile memory. The non-volatile memory HMAC store 62 outputs the non-volatile memory HMAC to an HMAC comparator 66. The comparator 66 also receives the HMAC generated by the host. If the host determines that the HMAC from the non-volatile memory and the host generated HMAC match in the comparator 66, then the communication is authenticated and, otherwise, a failure is produced.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   receiving in a host a list of protected and unprotected ranges of non-volatile memory; and
   reducing the processing to determine authenticity when accessing a protected memory range of the non-volatile memory compared to when accessing an unprotected range of said memory by using a measurement done for data in the past to authenticate different data thereafter.

2. The method of claim 1 comprising:
   authenticating data from the non-volatile memory using a host that receives information from the non-volatile memory together with a message authentication code;
   calculating a message authentication code on the host; and
   comparing the host generated message authentication code to the non-volatile memory generated authentication code.

3. The method of claim 1 including generating access control information including information about whether particular ranges of the memory are write protected.

4. The method of claim 3 including maintaining a table of the write protection status of different memory ranges.

5. The method of claim 4 including initially providing write protection status information to a host processor.

6. The method of claim 5 including providing write protection status information only once and reusing the information thereafter.

7. The method of claim 6 including providing the access control information in response to a special command received from a host.

8. The method of claim 7 including maintaining the access control information in a limited access region within the non-volatile memory.

9. The method of claim 1 including maintaining a non-volatile memory having some regions which are write protected and other regions which are not write protected and keeping the write protection status of said regions within access control information.

10. A computer readable medium storing instructions that, when executed, enable a host processor-based system to:
    receive a list of protected and unprotected ranges of non-volatile memory; and
    reduce the processing to determine authenticity when accessing a protected memory range of the non-volatile memory compared to when accessing an unprotected range of said memory by using a previous measurement done for data in the past to authenticate different data thereafter.

11. The medium of claim 10 further storing instructions to:
    authenticate data from the non-volatile memory using information from the non-volatile memory together with a message authentication code;
    calculate a message authentication code; and
    compare the host generated message authentication code to the non-volatile memory generated authentication code.

12. The medium of claim 10 further storing instructions to generate access control information including information about whether particular ranges of tbe memory are write protected.

13. The medium of claim 12 further storing instructions to maintain a table of the write protection status of different memory ranges.

14. The medium of claim 13 further storing instructions to reuse previously provided write protection status information.

15. The medium of claim 14 further storing instructions to obtain the access control information by sending a special command to the non-volatile memory.

16. A system comprising:
    a host processor;
    a non-volatile memory;
    a memory bus coupled between the host processor and the non-volatile memory; and
    the non-volatile memory to store a list of protected and unprotected ranges within said memory, said protected ranges being protected against writes and said unprotected ranges being unprotected against writes, wherein said non-volatile memory to store access control information including information about whether a particular range of memory is write protected.

17. The system of claim 16 wherein said host processor to authenticate data from the non-volatile memory using information from the non-volatile memory together with a message authentication code, calculate a method of authentication code, and compare a host generated message authentication code to a non-volatile memory generated at the authentication code.

18. The system of claim 16 wherein said access control information is maintained as a table that indicates the write protection status of different non-volatile memory ranges.

19. The system of claim 18 wherein said access control information is accessible only in response to a special command received from said host processor.

* * * * *

UNITED STATES PATENT AND TRADEMARK OFFICE
CERTIFICATE OF CORRECTION

PATENT NO.         : 7,743,239 B2
APPLICATION NO.    : 11/480308
DATED              : June 22, 2010
INVENTOR(S)        : Brent M. Ahlquist Page 1 of 1

It is certified that error appears in the above-identified patent and that said Letters Patent is hereby corrected as shown below:

Col. 6:
Line 28, "tbe" should be --the--.

Signed and Sealed this
Fifteenth Day of January, 2013

David J. Kappos
*Director of the United States Patent and Trademark Office*